United States Patent Office 2,836,495
Patented May 27, 1958

2,836,495

PRODUCTION OF READY-TO-EAT COMPOSITE FLAKED CEREAL PRODUCTS

Joseph John Thompson and Morris M. Raymer, Jr., Battle Creek, Mich., assignors to Kellogg Company, Battle Creek, Mich., a corporation of Delaware No Drawing. Application April 18, 1955
Serial No. 502,194

7 Claims. (Cl. 99—81)

This invention relates to the production of ready-to-eat food products of the breakfast cereal type.

More specifically, the present invention relates to the production of flaked products of composite character and enhanced nutritional properties, and to the novel composition thereof and the manner of making same.

It is a particular object of the present invention to enhance the protein content of such high starch-low protein content materials as rice and corn, by combining therewith a high protein content material which can be securely composited with rice or corn particles in relatively high proportion and which remains firmly adhered thereto as a unitary composite flake, as distinguished from other forms, for example, masticated and shredded products.

The invention is further characterized by combining wheat gluten flour as the prime protein enhancement source in view of its desirable amino acid content, and further by reason of its high protein content and inherent glutinous character, making possible firm adhesion of a desirably large percentage of protein material in proportion to the weight thereof. It will be understood, however, that other materials in powdered form of appreciable protein content may be simultaneously admixed with the wheat gluten in relatively minor amount for the purpose of contributing both their protein and taste or flavor modification values.

The invention is further characterized by the method of combining the aforesaid complementary materials, that is, although the starchy rice or corn particles are precooked in moisture, the added high protein flour is added with a limited amount of water but without cooking, following which the composited or high protein content flour coated rice or corn particles are flaked by rolling and then baked.

It is known to form cereal products of enhanced protein content of other types and compositions, such as shreds, by jointly cooking rice, corn or the like particles with soya bean particles, subsequently masticating the composite under pressure, as by shredding to form a substantially uniformly divided homogeneous composite, followed by toasting the resulting shreds, as set forth in U. S. Patent No. 2,421,216 to Penty. On the other hand, an attempt to form a flaked composite by cooking corn particles, and intermediate the cooking adding −10 mesh defatted soya bean particles in the proportion of one-third by weight of the corn, followed by drying, drolling into flakes and toasting, resulted in a nonuniform product containing a considerable proportion of separated soya fines which become much darker than the remaining composited material, and further the product had a distinctly noticeable beany and bitter taste characteristic of the original soya bean material, all of which rendered the product unsatisfactory as a ready-to-eat composite food product of the breakfast cereal type.

As distinguished from the foregoing, the product formed of the components and by the process of the present invention is of a uniform character wherein the added high protein content material remains firmly associated with the surfaces of the flakes, and is highly palatable and easily assimilated and digestible, the respective materials being complementary to each other.

In carrying out the process of the present invention, we employ particles of rice, preferably in the form of whole kernels, or corn particles of relatively large size, such as No. 4 grits, these materials having a relatively low protein content on the order of 7–8%. These particles are first washed and steamed and then subjected to cooking in water, together with seasoning and coloring material, such as salt, malt, syrup, sugar, and the like, in a conventional manner such as, for example, in a rotary cooker under 15 to 25 pounds steam pressure for a period of between one to two hours, or until the particles are uniformly cooked throughout, with no free white centers, and until they are in a soft and pliable but still individual particle condition. The cooked particles are then discharged at a moisture conent of about 40%, dried in a suitable manner, as with air at a temperature of 140–150° F. for about ten minutes to a moisture content of about 25%; tempered for five to six hours at 100–115° F.; any adhering particles separated and further dried at a temperature of 245–255° F. to a 21–22% moisture content; and then permitted to cool at normal room temperature for about 60 minutes to a moisture content of approximately 20%.

These precooked and dried particles are then coated with a proportioned amount of a flour of from about 60% to about 80% protein content and composed principally of, i. e. more than 50%, by weight of commercial wheat gluten. The rice or corn particles may comprise 70 to 85% and the protein flour 30 to 15% by weight of the composite, and the composite thus enriched to a total protein content as high as approximately 15 to 30%, and preferably to approximately 20% to 25% by weight.

In forming the composite thus precooked grains are fed forwardly in a conveyor equipped with a paddle mixer and just prior to addition of the proportioned amount of protein flour, warm water is sprayed onto the grain in the amount of from about 8 to about 14% of water by total weight of the solids. That is to say, the grain should not have an opportunity to absorb the added moisture before the protein flour is added, and the amount of added water is limited to permit the gluten content to become just sufficiently adhesive so that, by slow mixing for several minutes the grain can be uniformly coated and remain separated in individual particles with maximum retention of the proportionally added amount of protein flour. The coated grains are then moved forwardly and permitted to temper for a few minutes and then promptly fed between rolls and bumped to a medium thin flake. These flakes are then dried to a moisture content of 10–15%, tempered, and then baked for a short period so as to minimize destruction or modification of the proteins, and to convert the flakes to a slightly puffed, light golden condition. After leaving the baking oven and before cooling, the flakes may be sprayed with vitamins.

The following is a specific example of a suitable protein floor composition having an average protein content of about 70% and a moisture content of about 7% by weight:

|  | Parts by Weight | Protein Content, Percent |
|---|---|---|
| Wheat gluten | 1,000 | 81–82 |
| Wheat germ meal | 180 | 33–35 |
| Dried skim milk | 125 | 34–35 |
| Dried debittered brewers yeast | 31 | 46–52 |

As previously indicated, the wheat gluten content should comprise a major amount by weight of the protein flour by reason of its relatively high protein content, specific glutenous character and desirable amino acid content making possible introduction and secure association of a maximum amount of proteins with a minimum amount of material. The additional total minor amount of other high protein content materials may be employed in various proportions and combinations, not necessarily restricted to the materials and amounts described, when desired as a palatable supplement to the wheat gluten.

The following is a specific example of our process:

Whole rice kernels cooked and flavored as previously described, and at a moisture content of 20%, were passed through a proportional feeder into a conveyor trough equipped with a paddle mixer moving at the rate of 26–30 revolutions per minute. As the rice kernels moved forwardly in a uniform stream, protein flour of the above composition was proportionately added thereto to provide 81% of rice to 19% of protein flour. Just prior to the point of protein flour addition, water at a temperature of 110–180° F. was sprayed onto the rice at the rate of 10% of the total weight of the two solids, the point of water introduction being about thirty seconds in advance of the point of protein flour introduction, so that the rice was uniformly coated with water without opportunity to absorb it before the flour was added. Mixing while moving forwardly was then continued for approximately three minutes, during which time the rice became evenly coated and separated into individual kernels, each carrying an adherent layer of protein flour. If the speed of mixing is too great or if the rice has an opportunity to absorb the moisture before the flour is added, proper end results are not obtainable.

The coated rice was then transferred to a slow moving belt to allow approximately four minutes for tempering and then conveyed directly to bumping rolls and bumped to medium thin flakes. If too much time is allowed to elapse before bumping, the coating may fall off before it becomes firmly imbedded and adhered through the bumping step. The composite flakes were then dried to approximately 12% moisture at about 165° F., tempered 25 minutes at approximately 100° F., and then passed through an oven and baked for 15 to 30 seconds at an oven temperature of 390–450° F., to a slightly puffed, light golden condition. After discharge from the oven the flakes were subjected to a vitamin solution spray. The flakes had a protein content of approximately 20% by weight.

We claim:

1. The method of forming a composite palatable food product of the breakfast cereal type, which comprises admixing and coating cooked and dried flexible particles of the class consisting of rice and corn with uncooked relatively high protein content flour composed in major amount of wheat gluten, with the aid of a limited amount of moisture applied to the cooked particles just prior to the addition of the flour and before absorption of the moisture by said cooked particles, to provide the individual particles with adherent coatings of said flour, promptly rolling said coated particles to the form of flakes to further cohere and imbed the flour coating into the surfaces of the resulting flaked particle material, and then baking the composite flakes to a slightly puffed and light golden condition.

2. The method of forming a composite palatable food product of the breakfast cereal type, which comprises continuously moving forwardly a stream of cooked and dried flexible particles of the class consisting of rice and corn, spraying and mixing said particles with water to coat their surfaces therewith, promptly admixing with said moistened particles, and before absorption thereby of said moisture, a proportioned amount of powdered uncooked relatively high protein content material composed in major amount of wheat gluten, to adherently and substantially uniformly coat said particle material with said powdered material, promptly rolling the resulting coated particles to flakes, and baking the flakes to a slightly puffed condition.

3. The method of forming a composite palatable food product of the breakfast cereal type, which comprises continuously moving forwardly a stream of cooked and dried flexible particles of the class consisting of rice and corn, spraying and mixing said particles with water to coat their surfaces therewith, promptly admixing with said moistened particles, and before absorption thereby of said moisture, powdered uncooked relatively high protein content material composed in major amount of wheat gluten in the proportion of from about 15 to about 30 parts by weight to about 85 to 70 parts by weight of the cooked particle material, to adherently and substantially uniformly coat said particle material with said powdered material, promptly rolling the resulting coated particles to flakes, and baking the flakes to a slightly puffed condition.

4. The method of forming a composite palatable food product of the breakfast cereal type, which comprises continuously moving forwardly a stream of cooked and dried flexible rice particles, spraying and mixing said particles with water to coat their surfaces therewith, promptly admixing with said moistened particles, and before absorption thereby of said moisture, powdered uncooked relatively high protein content material composed in major amount of wheat gluten in the proportion of from about 15 to about 30 parts by weight to about 85 to 70 parts by weight of the cooked particle material, to adherently and substantially uniformly coat said particle material with said powdered material, promptly rolling the resulting coated particles to flakes, and baking the flakes to a slightly puffed condition.

5. The method of forming a composite palatable food product of the breakfast cereal type, which comprises continuously moving forwardly a stream of cooked and dried flexible particles of the class consisting of rice and corn, spraying and mixing said particles with water to coat their surfaces therewith, promptly admixing with said moistened particles, and before absorption thereby of said moisture, powdered uncooked relatively high protein content material composed in major amount of wheat gluten in the proportion of from about 15 to about 30 parts by weight to about 85 to 70 parts by weight of the cooked particle material, to adherently and substantially uniformly coat said particle material with said powdered material, promptly rolling the resulting coated particles to flakes, and baking the flakes to a slightly puffed condition by passing them through a zone heated to a temperature of from about 390° F. to about 450° F. in a period of from about 15 to about 30 seconds.

6. The method of forming a composite palatable flaked ready-to-eat food product of the breakfast cereal type, which comprises continuously moving forwardly a stream of cooked flexible particles of the class consisting of rice and corn dried to a moisture content of about 20% by weight, admixing therewith powdered uncooked relatively high protein content material composed in major amount of wheat gluten in the proportion of from about 15 to about 30 parts by weight to from about 85 to 70 parts by weight of the former, spraying said cooked particles with water immediately prior to addition of the powdered material to only surface coat said cooked particles thereby in the proportion of from about 8 to about 14% of water to the total weight of said solids, continuing the mixing to form individualized particles with an adherent substantially uniform coating of said powdered material, promptly rolling the resulting particles to the form of flakes and to further composite their respective components, and baking the flakes to a slightly puffed condition by passing them through a heated zone.

7. The method of forming a composite palatable flaked ready-to-eat food product of the breakfast cereal type, which comprises continuously moving forwardly a stream of cooked rice particles dried to a moisture content of about 20% by weight, admixing therewith powdered uncooked relatively high protein content powdered material composed in major amount of wheat gluten in the proportion of from about 20% to about 25% by weight to from about 80% to 75% by weight of the rice, spraying said rice with about 10% of water by weight of the total solids immediately prior to addition of the powdered material to only surface coat the rice particles with the water, continuing the mixing to form individualized rice particles with an adherent substantially uniform coating of said powdered material, promptly rolling the resulting particles to the form of flakes and to further compact their respective components, drying the flakes to a moisture content of about 12%, and then baking them to a slightly puffed condition by passing them through a zone heated to a temperature of about 390–450° F. in a period of from about 15 to about 30 seconds.

References Cited in the file of this patent

UNITED STATES PATENTS

| | | |
|---|---|---|
| 651,776 | Bourdeau | June 12, 1900 |
| 985,621 | Moser | Feb. 28, 1911 |
| 1,001,150 | Kellogg | Aug. 22, 1911 |
| 1,127,778 | Kitchen | Feb. 9, 1915 |
| 1,286,766 | Post | Dec. 3, 1918 |
| 2,436,519 | Luke | Feb. 24, 1948 |